United States Patent
Carrano et al.

[11] Patent Number: 5,720,236
[45] Date of Patent: Feb. 24, 1998

[54] MILK METER

[75] Inventors: James A. Carrano, Stoughton; Timothy E. Blair, Windsor; Roger K. Erdman, Janesville; William S. Nelson, Sun Prairie; Ronald J. Pulvermacher, Cottage Grove; George H. Tucker, Jr., Janesville, all of Wis.

[73] Assignee: DEC International, Inc., Madison, Wis.

[21] Appl. No.: 588,010

[22] Filed: Jan. 16, 1996

[51] Int. Cl.⁶ ............................................. A01J 5/01
[52] U.S. Cl. ............................ 119/14.46; 119/14.17
[58] Field of Search ........................ 119/14.46, 14.08, 119/14.54, 14.55, 14.47, 14.17

[56] References Cited

U.S. PATENT DOCUMENTS

| | | | |
|---|---|---|---|
| 3,150,637 | 9/1964 | Fosnes | 119/14.54 |
| 3,726,253 | 4/1973 | Duncan | 119/14.18 |
| 3,919,975 | 11/1975 | Duncan | 119/14.05 |
| 3,977,362 | 8/1976 | Jaquith | 119/14.14 |
| 4,112,758 | 9/1978 | Heidecker | 78/218 |
| 4,185,586 | 1/1980 | Flocchini | 119/14.08 |
| 4,231,324 | 11/1980 | Schletter | 119/14.17 |
| 4,269,143 | 5/1981 | Erbach | 119/14.49 |
| 4,287,853 | 9/1981 | Duncan | 119/14.55 |
| 4,306,454 | 12/1981 | Olrik et al. | 73/224 |
| 4,372,249 | 2/1983 | Kiestra et al. | 119/14.17 |
| 4,391,222 | 7/1983 | Icking et al. | 119/14.17 |
| 4,485,762 | 12/1984 | Sutton et al. | 119/14.17 |
| 4,530,307 | 7/1985 | Thompson | 119/14.49 |
| 4,530,370 | 7/1985 | Horky | 134/57 R |
| 4,537,152 | 8/1985 | Thompson | 119/14.54 |
| 5,080,041 | 1/1992 | Steingraber | 119/14.55 |
| 5,161,483 | 11/1992 | Moskvin | 119/14.17 |
| 5,178,095 | 1/1993 | Mein | 119/14.47 |
| 5,218,924 | 6/1993 | Thompson et al. | 119/14.02 |
| 5,291,853 | 3/1994 | Steingraber et al. | 119/14.54 |
| 5,313,833 | 5/1994 | Hoefelmayr | 119/14.17 X |

FOREIGN PATENT DOCUMENTS 0134836  3/1985  European Pat. Off.

*Primary Examiner*—Gene Mancene
*Assistant Examiner*—Yvonne R. Abbott
*Attorney, Agent, or Firm*—Andrus, Sceales, Starke & Sawall

[57] ABSTRACT

A milk meter (22) has a measuring chamber (40) with an inlet (42) receiving milk from a mammal's teat (24), a discharge chamber (48) having an inlet (50) from the measuring chamber and an outlet (52) discharging the milk to a collection tank (32), a central vertically reciprocal plunger valve (46) opening and closing the outlet of the measuring chamber and communication vacuum from the discharge chamber through the plunger to the measuring chamber, and a level sensing float (56) in the measuring chamber and circumscribing the plunger valve and vertically reciprocal therealong.

36 Claims, 6 Drawing Sheets

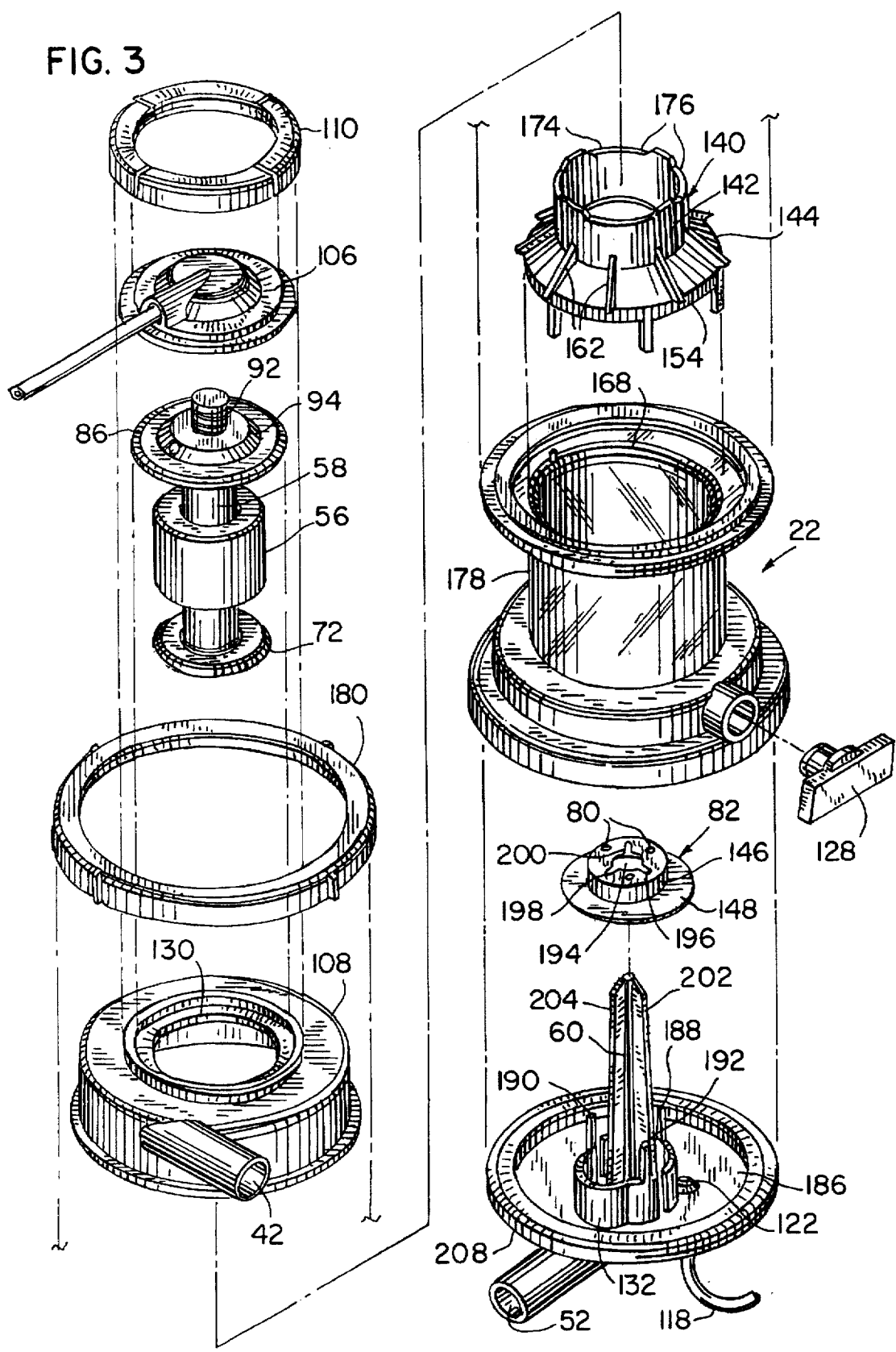

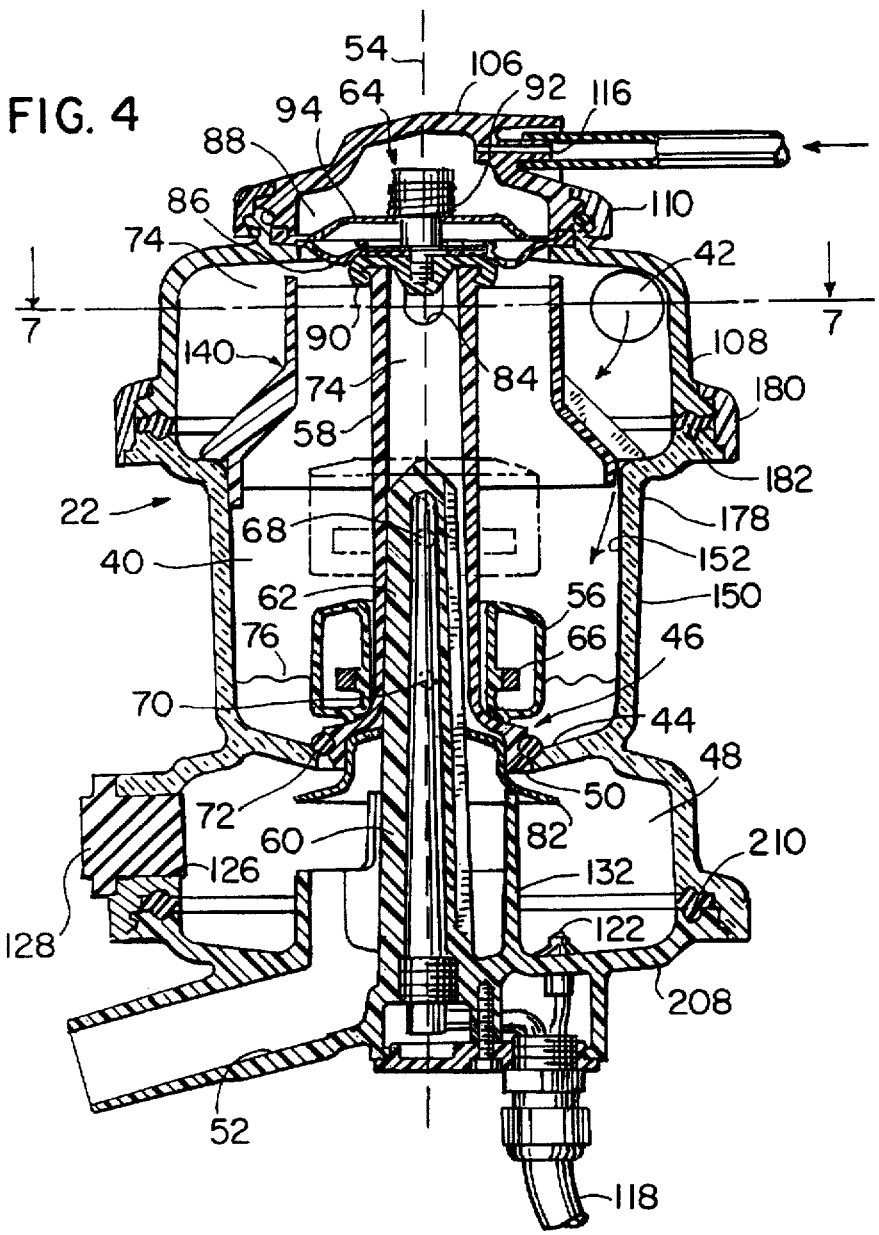

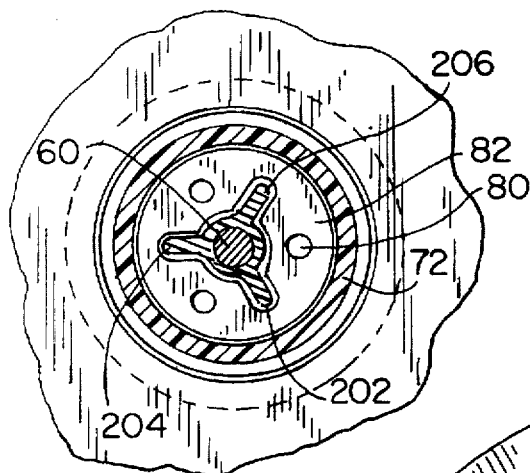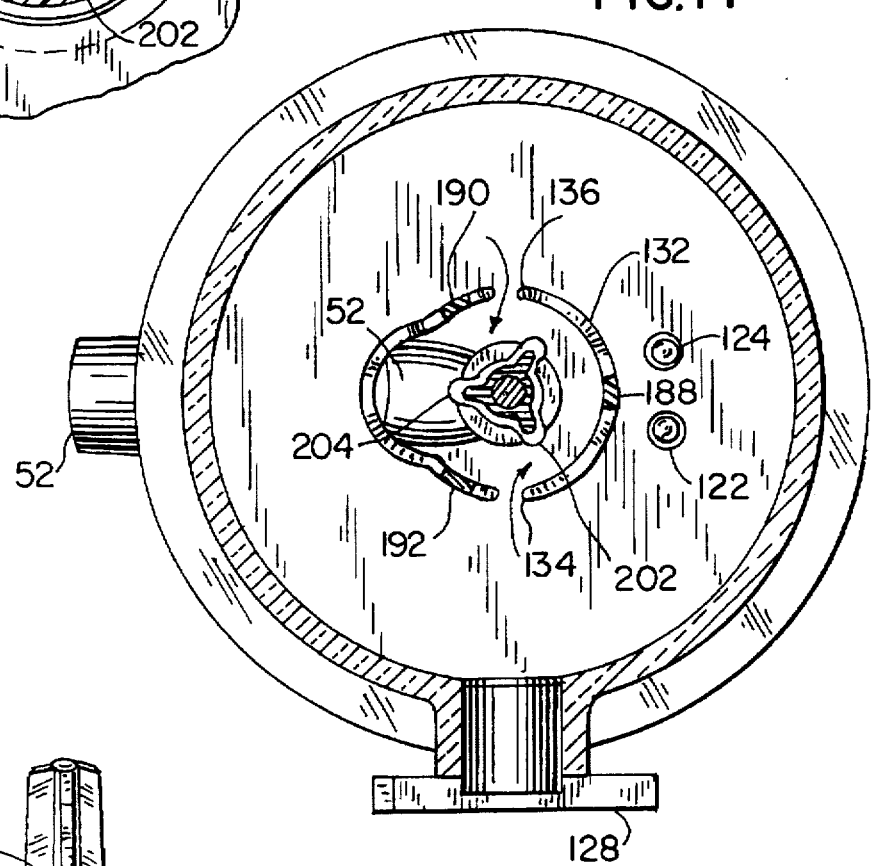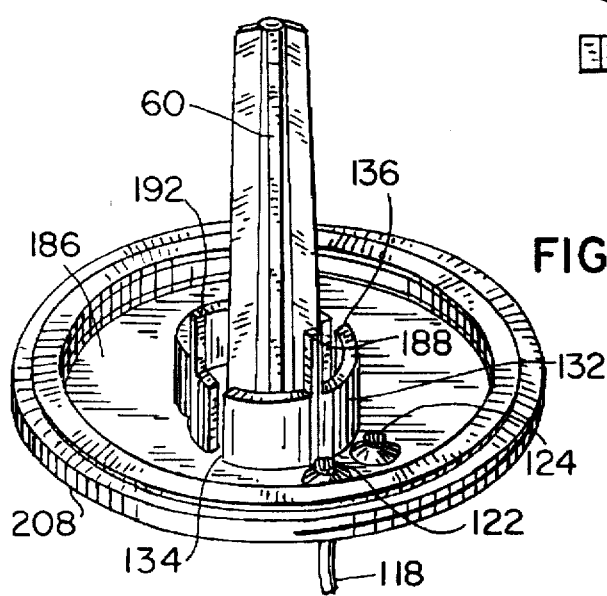

MILK METER

BACKGROUND AND SUMMARY

The invention relates to milk meters for measuring milk production from mammals including cows, water buffalo, sheep and goats.

A milk meter receives milk from a mammal's teat through a milking claw, measures same, and then sends the milk on to a collection tank. Various milk meters are known in the prior art. The present invention relates to continued design improvements, particularly in simplicity, ease of use, and low maintenance.

BRIEF DESCRIPTION OF THE DRAWINGS

FIG. 3 is an exploded perspective view of the milk meter of FIG. 2.

FIG. 4 is a sectional view of the milk meter of FIG. 2.

FIG. 5 is an enlarged view of a portion of the structure of FIG. 4.

FIG. 13 is a sectional view taken along line 13—13 of FIG. 11.

FIG. 14 is a sectional view taken along line 14—14 of FIG. 11.

FIG. 15 is an enlarged view of a portion of the structure of FIG. 3.

DETAILED DESCRIPTION

Figure 1:
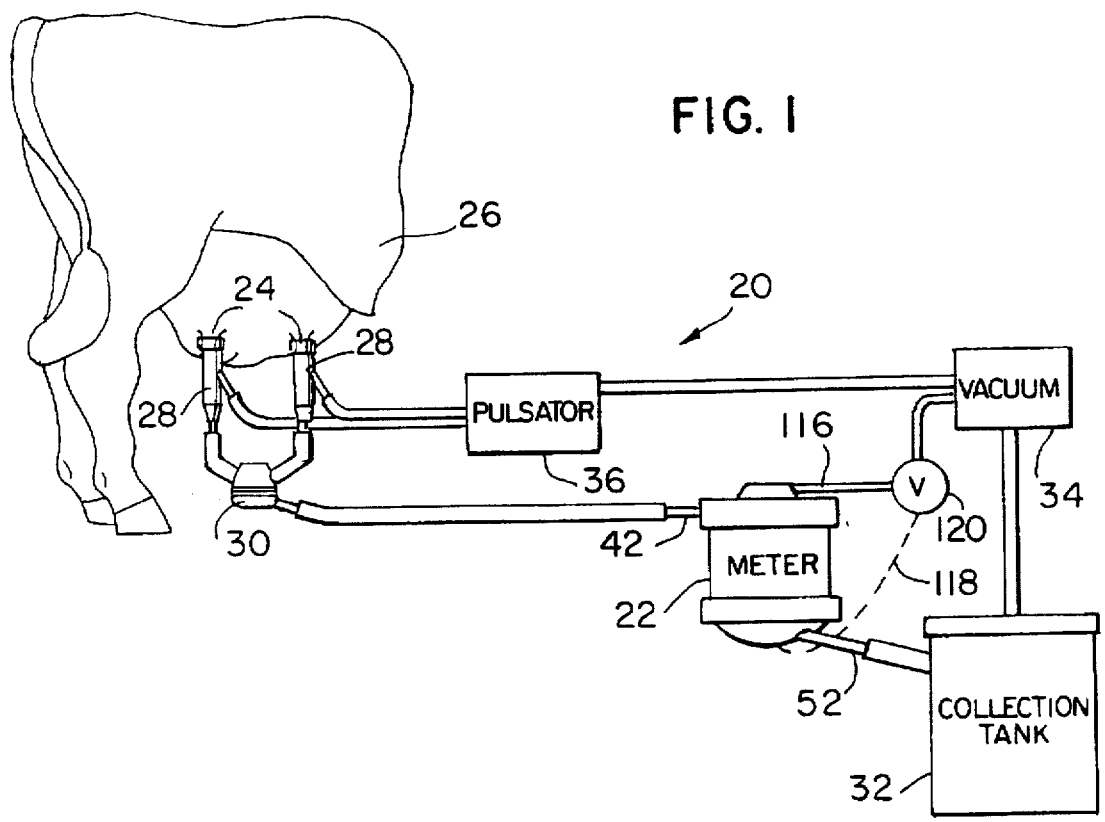
FIG. 1 is a schematic illustration of a milking installation using a milk meter.

FIG. 1 schematically shows a milking installation 20 as known in the prior art, including a milk meter 22 receiving milk from the teats 24 of a mammal, such as cow 26, through teat cups 28 and milking claw 30, and passing the milk on to collection tank 32 as drawn by vacuum from vacuum source 34, which vacuum is also supplied to the teat cups through and controlled by pulsator 36, all as is standard in the prior art, for which further reference is made to U.S. Pat. Nos. 4,269,143, 4,530,307, 4,537,152, 5,080,041, 5,178,095, 5,218,924, and 5,291,853, incorporated herein by reference. The present invention relates to improvements in milk meter 22.

Figure 2:
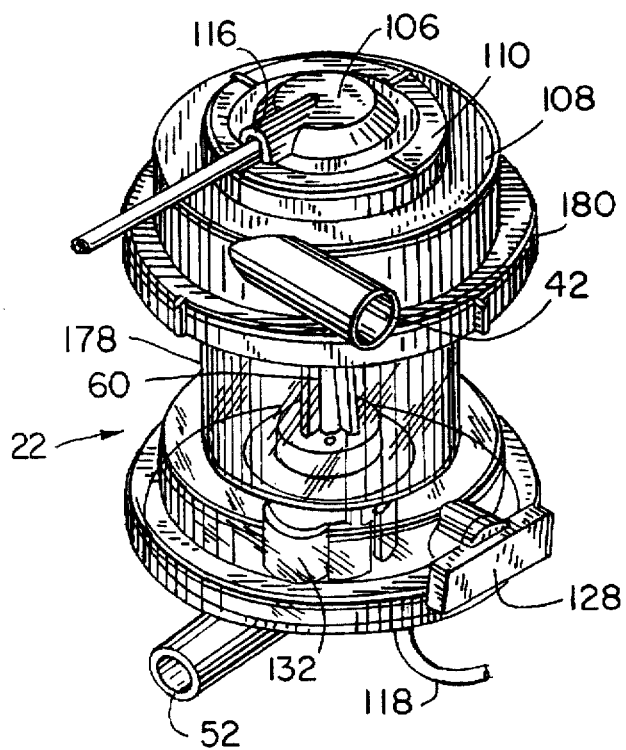
FIG. 2 is a perspective view of a milk meter in accordance with the invention.
Figure 6:
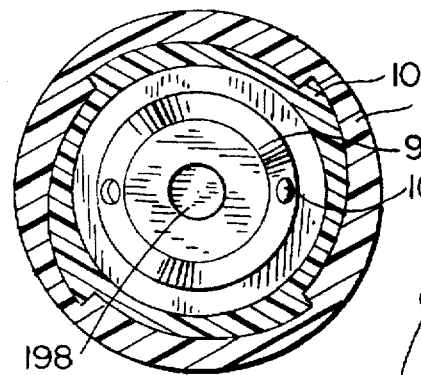
FIG. 6 is a sectional view taken along line 6—6 of FIG. 5.

Milk meter 22, FIGS. 2-4, has a measuring chamber 40, FIG. 4, having an inlet 42 receiving milk from the cow's teat, and an outlet 44. A valve 46 opens and closes outlet 44, FIGS. 11 and 4. A discharge chamber 48 has an inlet 50 receiving milk from outlet 44 of measuring chamber 40 when valve 46 is open, and has an outlet 52 discharging milk to collection tank 32.

Valve 46 is movable along a vertical axis 54 extending into measuring chamber 40. Sensor 56 on axis 54 senses milk level in measuring chamber 40, to determine the volumetric amount of milk received, and controls valve 46 in response thereto. Sensor 56 is a movable donut-shaped float in measuring chamber 40 and is reciprocal along axis 54. Valve 46 is a movable plunger 58 in measuring chamber 40 and is reciprocal along axis 54. Float 56 circumscribes plunger 58 and is guided there along for reciprocal movement along axis 54 according to the level of milk in measuring chamber 40.

Measuring chamber 40 is above discharge chamber 48 and coaxial therewith along vertical axis 54. Lower discharge chamber 48 has a stationary pedestal 60 extending upwardly along axis 54. Plunger 58 is guided by pedestal 60 in concentric relation therewith. Float 56 in measuring chamber 40 is reciprocal along axis 54 in concentric relation with pedestal 60 and plunger 58. Plunger 58 circumscribes pedestal 60, and float 56 circumscribes plunger 58. Pedestal 60 extends from discharge chamber 48 upwardly through inlet 50 of discharge chamber 48 and through outlet 44 of measuring chamber 40 and has an upper portion 62 extending upwardly a given distance into measuring chamber 40. Measuring chamber 40 has a valve actuating mechanism 64, to be described. Plunger 58 extends downwardly from valve actuating mechanism 64 and circumferentially around pedestal 60 at upper portion 62. Float 56 has an internal ring-shaped magnet 66. Pedestal 60 has magnetically responsive sensors 68 and 70 at vertically spaced positions in upper portion 62 of the pedestal for sensing different levels of float 56 in measuring chamber 40 for controlling valve actuating mechanism 64, for raising plunger 58 to open the valve, FIG. 11, and for lowering plunger 58 to close the valve, FIG. 4. Magnetic sensors 68 and 70 are preferably reed switches, though other types of sensors may be used.

Discharge chamber 48 is subject to vacuum at outlet 52 from vacuum source 34 for drawing milk from discharge chamber 48 to collection tank 32. Valve plunger 58 has a lower peripheral O-ring seal 72 for closing outlet 44 of measuring chamber 40. Plunger 58 has a vacuum-transfer passage 74 through the hollow interior thereof communicating vacuum from discharge chamber 48 through plunger 58 to measuring chamber 40 at a level 74 above the highest level of milk therein, including lower fill level 76 triggering the valve closed, FIG. 4, and higher fill level 78 triggering the valve open, FIG. 11, to be described. The vacuum is communicated from discharge chamber 48 through openings 80 in lower baffle 82, to be described, through central vacuum transfer passage 74 in plunger 58, through openings 84 at the top of plunger 58, and into measuring chamber 40 above the level of milk therein.

Valve actuating mechanism 64 includes a movable diaphragm 86 having a lower side subject to vacuum in measuring chamber 40 supplied through vacuum-transfer passage 74 in plunger 58. Diaphragm 86 has an upper side subject to variable vacuum in chamber 88. The lower side of diaphragm 86 has an annular elastomeric holder 90 attached thereto and releasably engaging and gripping the top of plunger 58 in snap-in relation to move the plunger to open and close outlet 44 of measuring chamber 40, FIGS. 11 and 4.

Actuating mechanism 64 includes a biasing spring 92 biasing plunger 58 upwardly, such that when vacuum is applied to the upper side of diaphragm 86 which balances the vacuum on the lower side of the diaphragm, plunger 58 moves upwardly under the bias of biasing spring 92. Biasing spring 92 bears at its lower end against a stationary plate 94, FIG. 5, and at its upper end against an enlarged head 96 of a stud 98 extending downwardly through plate 94 and having a lower threaded end 100 extending through backing plate 102 and diaphragm 86 and threaded into holder 90 coupled to plunger 58. Vacuum is supplied to the upper side of diaphragm 86 through holes 104 in plate 94 from chamber 88. Chamber 88 is defined by an upper cap 106 mounted to housing member 108 by threaded annular retaining ring 110 and sealed at O-ring 112 and the outer circumferential edge 114 of diaphragm 86. Cap 106 has a control port 116 for supplying the noted variable vacuum to cap chamber 88, which is applied against the upper side of diaphragm 86.

Figures 11, 12:
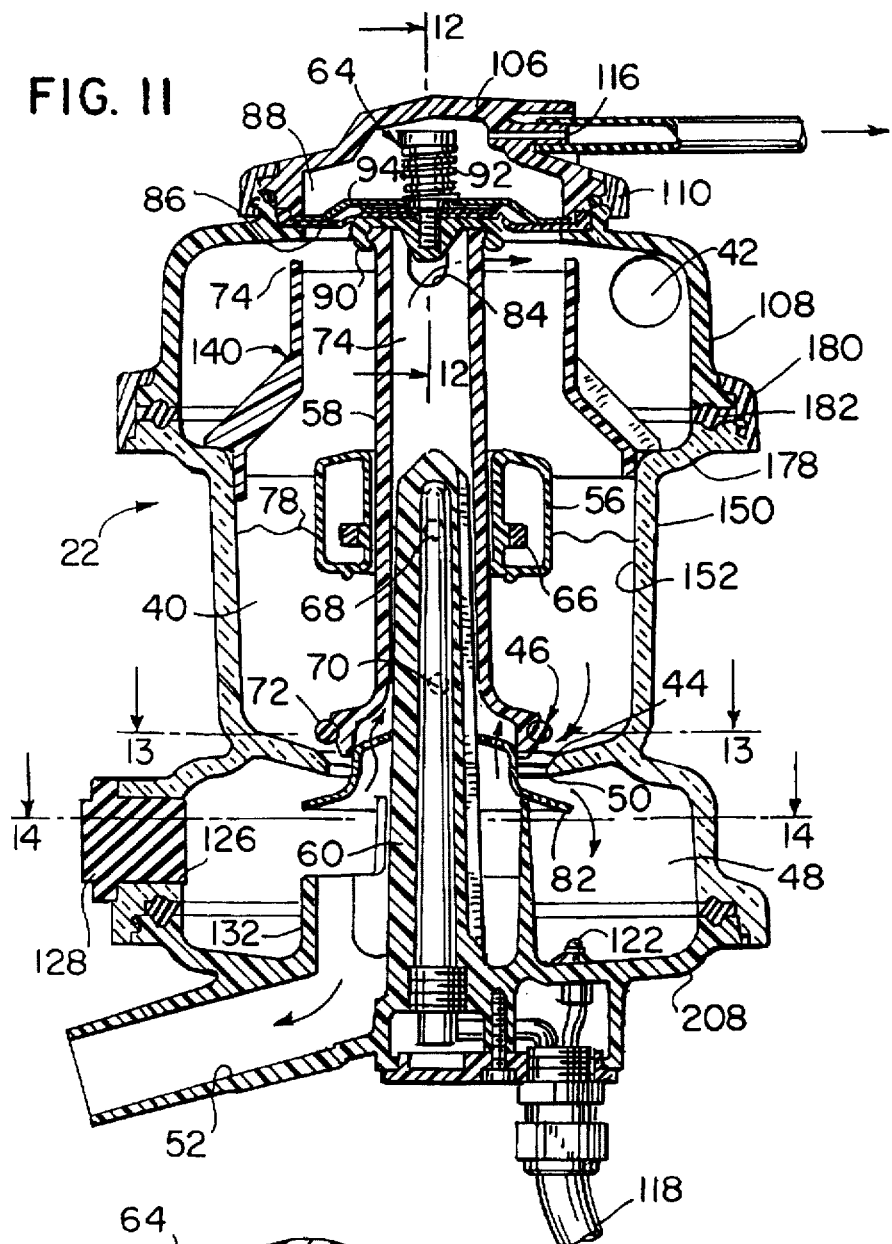
FIG. 11 is like FIG. 4 and shows the valve in an open condition.
FIG. 12 is a sectional view taken along line 12—12 of FIG. 11.

In operation, when the milk in measuring chamber 40 rises to level 78, FIG. 11, upper reed switch 68 in pedestal 60 is closed due to the magnetic force field from magnet 66, which closure of reed switch 68 sends an electrical control signal via conductor 118 to valve 120, FIG. 1, which valve 120 then applies vacuum from source 34 to control port 116 to apply vacuum through chamber 88 and holes 104 to the upper side of diaphragm 86 to balance the vacuum on the lower side of vacuum 86, such that plunger 58 moves upwardly under the bias of biasing spring 92 to the position shown in FIG. 11. This opens valve 46 to permit milk to flow from measuring chamber 40 through outlet 44 and inlet 50 into discharge chamber 48 until the level of milk in measuring chamber 40 drops to level 76, FIG. 4. As float 56 moves downwardly, upper reed switch 68 opens to its normally open position, due to its own inherent bias, as magnet 66 moves away therefrom. When float 56 reaches lower level 76, lower reed switch 70 then closes due to the magnetic force field from magnet 66, which closure of reed switch 70 sends an electrical control signal via conductor 118 to valve 120 to cut-off the supply of vacuum to control port 116 and instead supply atmospheric air thereto, such that there is atmospheric air pressure applied through chamber 88 and holes 104 to the upper side of diaphragm 86, thus creating a pressure differential across diaphragm 86 due to the vacuum applied against the lower side of diaphragm 86, such that diaphragm 86 and plunger 58 move downwardly to the position shown in FIG. 4 closing valve 46, and repeating the cycle as the milk again fills to level 78. As plunger 56 moves upwardly and magnet 66 moves away from lower reed switch 70, the latter reed switch opens to its normally open position under its own inherent bias.

The height and density of the float are designed to minimize measurement errors due to milk foam. Any milk present in foam above the top of the float is not measured. Essentially, the float is designed to have at least one third of the float below the surface of the liquid, and to extend high enough above the surface of the liquid milk so that at least 99.5% of the total milk mass (liquid and foam) is below the top surface of the float. This reduces the error from unmeasured milk to less than 0.5%.

Connection 118 also carries a signal from a pair of conductivity probes 122 and 124 for measuring milk conductivity. Some researchers suggest that conductivity measurements might aide in determining a cow's udder health. Because mastitic milk has higher levels of sodium and chlorine and lower levels of potassium than healthy milk, the measure of electrical conductivity of the milk may enable detection of early problems.

Discharge chamber 48 has a dam wall 132, FIGS. 3, 14 and 15, around outlet 52 of the discharge chamber. The dam wall has limited-flow openings 134, 136 therein such that milk in discharge chamber 48 slowly exits the discharge chamber through openings 134, 136 to outlet 52 without slugging. Conductivity probes 122 and 124 are in discharge chamber 48 adjacent the base of dam wall 132, to maximize contact with pooled milk, and enhance conductivity measurement.

The discharge chamber also has a milk sampling access port 126 therein with a removable plug 128 for allowing sampling of milk from discharge chamber 48 after measurement in measuring chamber 40.

Measuring chamber 40 has an upper opening 130 of diameter larger than the diameter of outlet 44 of discharge chamber 40 and also larger than the diameter of lower peripheral seal 72 of plunger 58. Upper cap 106 is attached to the measuring chamber at upper opening 130 and mounts valve actuating mechanism 64. Cap 106 is removable from the measuring chamber by unscrewing ring 110 from housing portion 108. This permits the operator to access plunger 58 through access opening 130 and permit removal of plunger 58 through access opening 130.

A first baffle 140, FIGS. 3 and 4, is provided in measuring chamber 40 and directs milk flow from inlet 42 of the measuring chamber into the measuring chamber. A second baffle 82 is provided in the discharge chamber 48 and directs milk flow from inlet 50 of the discharge chamber into the discharge chamber. The baffles are coaxially aligned along vertical axis 54. Each of the baffles is a hat-shaped member. Hat-shaped baffle 140 has a central portion 142, and an outer portion 144 extending radially outwardly and downwardly therefrom. Hat-shaped baffle 82 has a central portion 146, and an outer portion 148 extending radially outwardly and downwardly therefrom. Central portion 142 of baffle 140 has a larger diameter than central portion 146 of baffle 82. Outer portion 144 of baffle 140 has a larger diameter than outer portion 148 of baffle 82. The hollow interior 74 of plunger 58 provides a vacuum transfer passage extending between baffles 82 and 140 and communicating vacuum from discharge chamber 48 to measuring chamber 40 at a location above the highest level of milk in the measuring chamber. Openings 80 in baffle 82 communicate vacuum therethrough such that vacuum is communicated from discharge chamber 48 through baffle 82 through vacuum transfer passage 74 to baffle 140 and measuring chamber 40 above the level of milk therein.

Figure 9:
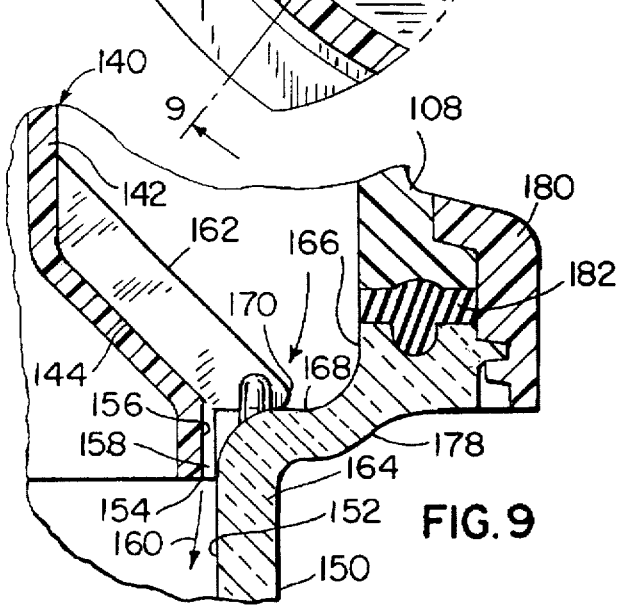
FIG. 9 is a sectional view taken along line 9—9 of FIG. 8.
Figure 10:
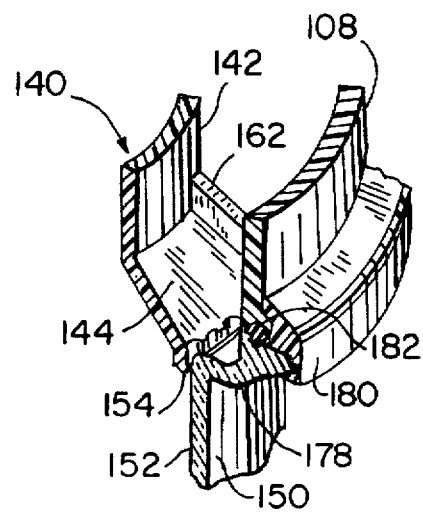
FIG. 10 is an enlarged view, partially cut away, of a portion of the structure of FIG. 2.

Measuring chamber 40 is provided by a cylindrical chamber having a cylindrical wall 150 with an inner surface 152. Baffle 140 is an umbrella baffle in cylindrical chamber 40 directing milk flow from inlet 42 in an umbrella pattern to inner surface 152 of cylindrical wall 150 to flow downwardly therealong. Baffle 140 is a frustoconical member having skirt portion 144 tapered downwardly and outwardly toward inner surface 152 of cylindrical wall 150 and having a periphery 154 at least a portion 156 of which, FIG. 9, is spaced from inner surface 152 of cylindrical wall 150 by a radial gap 158 through which milk flows as shown at arrow 160.

Figure 7:
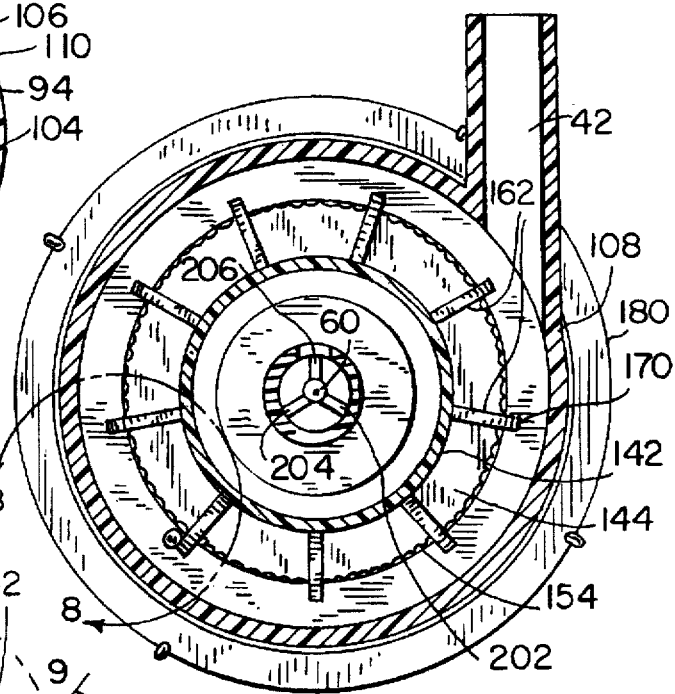
FIG. 7 is a sectional view taken along line 7—7 of FIG. 4.
Figure 8:
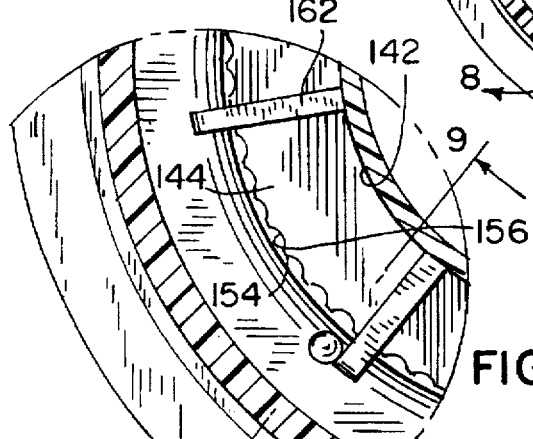
FIG. 8 is a sectional view taken along line 8—8 of FIG. 7.

Inlet 42 introduces milk along a tangential flow path, FIGS. 2, 3 and 7. A plurality of circumferentially spaced ribs 162 extend radially outwardly and downwardly along skirt portion 144 to absorb energy and break-up tangential milk flow from inlet 42 and convert same to radial outward and downward flow toward inner surface 152 of cylindrical wall 150. Periphery 154 of skirt portion 144 is serrated, FIG. 8, to define multiple flow streams along inner surface 152 of cylindrical wall 150.

The cylindrical chamber is defined by a lower portion 164 of a first diameter, and an upper portion 166 of a second larger diameter. Upper portion 166 transitions to lower portion 164 at an annular shoulder 168. Inlet 42 is in the upper portion. Ribs 162 have outer tips 170 resting on shoulder 168, such that milk flows radially outwardly and downwardly along skirt portion 144 between respective ribs 162 and toward shoulder 168 and then downwardly through gap 158 and along inner surface 152 of cylindrical wall 150.

Baffle 140 has outer surfaces 142 and 144 along which milk flows, and an inner surface 172 facing an interior portion 174 of the baffle. Vacuum is supplied to interior portion 174 of the baffle from vacuum transfer passage 74 through openings 84 in plunger 58. A vacuum transfer passage 74 is provided from the interior 174 of baffle 140 to the portion of measuring chamber 40 surrounding baffle 140 and above the level of milk in the measuring chamber by spacing the top of baffle 140 below the top of housing portion 108 and/or providing openings or recesses such as 176 in the baffle. Housing section 108 is attached to housing section 178 by threaded annular ring 180, and sealed thereto by gasket 182.

Baffle 82 in discharge chamber 48 directs milk flow from inlet 50 into the discharge chamber. Baffle 82 is at inlet 50 of discharge chamber 48. Baffle 82 extends upwardly into outlet 44 of measuring chamber 40 at central portion 146. Outer peripheral flange portion 148 is spaced from inlet 50 by a gap 184 through which milk flows which is then directed away from central portion 146 of baffle 82 and radially outwardly along flange 148 into discharge chamber 48. Baffle 82 is located in discharge chamber 48 between inlet 50 and outlet 52. Outer flange portion 148 directs milk flow into discharge chamber 48 laterally beyond dam wall 132, to prevent direct milk flow from inlet 50 to outlet 52 of the discharge chamber, such that milk must flow through limited-flow openings 134, 136 in dam wall 132.

Discharge chamber 48 has a lower floor 186 with an opening 52 providing the noted outlet of discharge chamber 48. Dam wall 132 includes support wall portions 188, 190, 192 extending upwardly from lower floor 186 and supporting baffle 82 proximate inlet 50 of discharge chamber 48. Baffle 82 has a central opening 194 with slots 196, 198, 200 through which extend respective radial spokes 202, 204, 206 of pedestal 60 for orienting and guiding the baffle. Lower floor 186 is formed in lower housing section 208 which is secured to housing section 178 in thread mounted relation and sealed thereto at gasket 210.

It is recognized that various equivalents, alternatives and modifications are possible within the scope of the appended claims.

We claim:

1. A milk meter comprising:
a measuring chamber having an inlet receiving milk from a mammal's teat, and an outlet;
a valve movable along an axis extending into said measuring chamber and opening and closing said outlet;
a discharge chamber having an inlet receiving milk from said outlet of said measuring chamber when said valve is open, and an outlet discharging the milk to a collection tank;
a sensor on said axis of movement of said valve and sensing milk level in said measuring chamber and controlling said valve in response thereto.

2. The milk meter according to claim 1 wherein said sensor comprises a movable float in said measuring chamber and reciprocal along said axis.

3. The milk meter according to claim 2 wherein:
said valve comprises a movable plunger in said measuring chamber and reciprocal along said axis;
said float circumscribes said plunger and is guided therealong for reciprocal movement along said axis according to the level of milk in said measuring chamber.

4. A milk meter comprising:
a measuring chamber having an inlet receiving milk from a mammal's teat, and an outlet;
a discharge chamber below said measuring chamber and coaxial therewith along a vertical axis, said discharge chamber having an inlet receiving milk from said outlet of said measuring chamber, and an outlet discharging the milk to a collection tank;
a stationary pedestal in at least one of said chambers and extending along said axis;
a valve opening and closing said outlet of said measuring chamber, said valve comprising a movable plunger reciprocal along said axis and guided by said pedestal in concentric relation therewith;
a movable float in said measuring chamber reciprocal along said axis in concentric relation with said pedestal and said plunger and sensing milk level in said measuring chamber.

5. The milk meter according to claim 4 wherein:
said plunger circumscribes said pedestal; and
said float circumscribes said plunger.

6. The milk meter according to claim 5 wherein: in:
said pedestal extends from said discharge chamber upwardly through said inlet of said discharge chamber and through said outlet of said measuring chamber and has an upper portion extending upwardly a given distance into said measuring chamber;
said measuring chamber has a valve actuating mechanism; and
said plunger extends downwardly from said valve actuating mechanism and circumferentially around said pedestal.

7. The milk meter according to claim 6 wherein:
said float comprises a magnet; and
said pedestal has magnetically responsive sensors at vertically spaced positions in said upper portion of said pedestal for sensing different levels of said float in said measuring chamber for controlling said valve actuating mechanism.

8. A milk meter comprising:
a measuring chamber having an inlet receiving milk from a mammal's teat, and an outlet;
a discharge chamber below said measuring chamber and having an inlet receiving milk from said outlet of said measuring chamber, and an outlet discharging the milk to a collection tank, said discharge chamber being subject to vacuum at said outlet for drawing milk therefrom to said collection tank;
a valve opening and closing said outlet of said measuring chamber, comprising a movable plunger having a seal for closing said outlet of said measuring chamber and having a vacuum transfer passage communicating vacuum from said discharge chamber through said plunger to said measuring chamber at a level above the level of milk therein.

9. The milk meter according to claim 8 wherein:
said measuring chamber has a valve actuating mechanism comprising a movable diaphragm;
said diaphragm has one side subject to vacuum in said measuring chamber supplied through said vacuum transfer passage in said plunger;
said diaphragm has an opposite side subject to variable vacuum; and
said diaphragm is coupled to said plunger to move the latter to open and close said outlet of said measuring chamber.

10. The milk meter according to claim 9 wherein said actuating mechanism comprises a biasing member biasing said plunger in a first direction, such that when vacuum is applied to said opposite side of said diaphragm which balances the vacuum on said one side of said diaphragm, said plunger moves in said one direction under the bias of said biasing member.

11. The milk meter according to claim 8 wherein:

said measuring chamber has an upper opening of diameter larger than said outlet of said measuring chamber and also larger than said seal of said plunger;

and comprising an upper cap attached to said measuring chamber at said upper opening and mounting a valve actuating mechanism engaging said plunger and operable to move said plunger to open and close said outlet of said measuring chamber, wherein:

said plunger is accessible for removal through said upper opening of said measuring chamber upon removal of said cap.

12. A milk meter comprising:

a measuring chamber having an inlet receiving milk from a mammal's teat, and an outlet;

a valve opening and closing said outlet;

a discharge chamber having an inlet receiving milk from said outlet of said measuring chamber when said valve is open, and an outlet discharging the milk to a collection tank;

a valve actuator at the opposite end of said measuring chamber from said discharge chamber and actuating said valve to open and close same, wherein:

said valve comprises a movable plunger having a peripheral seal for closing said outlet of said measuring chamber;

said measuring chamber has an access opening of larger diameter than said outlet of said measuring chamber and also larger than said peripheral seal of said plunger;

and comprising a cap attached to said measuring chamber at said access opening, wherein:

said cap mounts a valve actuating mechanism engaging said plunger and operable to move said plunger to open and close said outlet of said measuring chamber; and said cap is removable from said measuring chamber to access said plunger through said access opening and permit removal of said plunger through said access opening.

13. A milk meter comprising:

a measuring chamber having an inlet receiving milk from a mammal's teat, and an outlet;

a discharge chamber having an inlet receiving milk from said outlet of said measuring chamber, and an outlet discharging the milk to a collection tank;

a valve comprising a movable plunger having a seal for opening and closing said outlet of said measuring chamber;

a valve actuating mechanism comprising a movable diaphragm subject to variable vacuum and coupled to said plunger to move the latter to open and close said outlet of said measuring chamber, wherein:

said measuring chamber is subject to vacuum;

said diaphragm has one side subject to vacuum in said measuring chamber;

and comprising a cap mounted to said measuring chamber and having a control port for supplying said variable vacuum to said cap, wherein:

said diaphragm has another side subject to said variable vacuum in said cap supplied through said control port.

14. A milk meter comprising:

a measuring chamber having an inlet receiving milk from a mammal's teat, and an outlet;

a discharge chamber having an inlet communicating with said outlet of said measuring chamber, and an outlet for discharging milk to a collection tank;

a stationary pedestal in at least one of said chambers and defining an axis extending through both of said chambers;

a valve opening and closing said outlet of said measuring chamber, comprising a movable plunger reciprocal along said axis and guided by said pedestal in concentric relation therewith;

a level sensor on said axis and responsive to milk level in said measuring chamber to control opening and closing of said valve.

15. The milk meter according to claim 14 wherein:

said discharge chamber is below said measuring chamber; and said level sensor is in said measuring chamber and above said discharge chamber.

16. The milk meter according to claim 14 wherein said discharge chamber has a milk sampling access port therein with a removable plug for allowing sampling of milk from said discharge chamber after measurement in said measuring chamber.

17. The milk meter according to claim 14 comprising a pair of electrical conductivity probes in said discharge chamber defining an electrical path therebetween through the milk in said discharge chamber for determining electrical conductivity of the milk.

18. The milk meter according to claim 14 wherein:

said discharge chamber has a dam wall around said outlet of said discharge chamber;

said dam wall has a limited-flow opening therein such that milk in said discharge chamber slowly exits said discharge chamber through said opening in said dam wall to said outlet of said discharge chamber without slugging.

19. The milk meter according to claim 18 comprising a pair of electrical conductivity probes in said discharge chamber adjacent said dam wall to maximize contact with pooled milk and defining an electrical path therebetween through the milk in said discharge chamber for determining electrical conductivity of the milk, said maximized contact of said conductivity probes with pooled milk enhancing conductivity measurement.

20. A milk meter comprising:

a measuring chamber having an inlet receiving milk from a mammal's teat, and an outlet;

a discharge chamber having an inlet communicating with said outlet of said measuring chamber, and an outlet for discharging milk to a collection tank;

a valve opening and closing said outlet of said measuring chamber, comprising a plunger reciprocal along a vertical axis extending through said measuring chamber, said outlet of said measuring chamber, said inlet of said discharge chamber and said discharge chamber;

a level sensor responsive to milk level in said measuring chamber to control opening and closing of said valve, said level sensor comprising a float coaxial with and vertically reciprocal along said vertically reciprocal plunger.

21. The milk meter according to claim 20 wherein:

said measuring chamber has a lower floor with an aperture therein providing said outlet of said measuring chamber communicating with said discharge chamber therebelow;

said plunger has a seal for closing said aperture;

and comprising a stationary pedestal extending from said discharge chamber upwardly through said aperture and into said measuring chamber, wherein:
said float circumscribes said plunger; and
said plunger circumscribes said pedestal and extends downwardly therealong in telescoping relation.

22. A milk meter comprising:

a measuring chamber having an inlet receiving milk from a mammal's teat, and an outlet;

a discharge chamber having an inlet receiving milk from said outlet of said measuring chamber, and an outlet discharging the milk to a collection tank;

a first baffle in said measuring chamber directing milk flow from said inlet of said measuring chamber into said measuring chamber;

a second baffle in said discharge chamber directing milk flow from said inlet of said discharge chamber into said discharge chamber.

23. The milk meter according to claim 22 wherein said first and second baffles are coaxially aligned along an axis extending through said measuring chamber, said outlet of said measuring chamber, said inlet of said discharge chamber, and said discharge chamber.

24. The milk meter according to claim 22 wherein:

each of said first and second baffles is a hat shaped member having a central portion, and an outer portion extending radially outwardly and downwardly therefrom;

said central portion of said first baffle has a larger diameter than said central portion of said second baffle; and said outer portion of said first baffle has a larger diameter than said outer portion of said second baffle.

25. The milk meter according to claim 22 comprising:

means supplying vacuum to said discharge chamber; and vacuum transfer means communicating vacuum from said discharge chamber to said measuring chamber at a location above the highest level of milk in said measuring chamber, said vacuum transfer means comprising vacuum passage means extending between said first and second baffles.

26. The milk meter according to claim 25 comprising an opening in said second baffle communicating vacuum therethrough, such that vacuum is communicated from said discharge chamber through said second baffle, through said vacuum transfer means, to said first baffle and said measuring chamber above the level of milk therein.

27. A milk meter comprising a measuring chamber having an inlet receiving milk from a mammal's teat, and an outlet, said measuring chamber comprising a cylindrical chamber having a cylindrical wall with an inner surface, a baffle in said cylindrical chamber directing milk flow from said inlet to said inner surface of said cylindrical wall to flow therealong, wherein said baffle comprises a frustoconical member having a skirt portion tapered downwardly and outwardly toward said inner surface of said cylindrical wall and having a periphery at least a portion of which is spaced from said inner surface of said cylindrical wall by a radial gap through which milk flows.

28. The milk meter according to claim 27 wherein:

said inlet introduces milk along a tangential flow path;

and comprising a plurality of circumferentially spaced ribs extending radially outwardly and downwardly along said skirt portion to absorb energy and break-up tangential milk flow from said inlet and convert same to radial outward and downward flow toward said inner surface of said cylindrical wall.

29. The milk meter according to claim 28 wherein said periphery of said skirt portion is serrated to define multiple flow streams along said inner surface of said cylindrical wall.

30. The milk meter according to claim 28 wherein:

said cylindrical chamber comprises a lower portion of a first diameter, and an upper portion of a second larger diameter;

said upper portion transitions to said lower portion at an annular shoulder;

said inlet is in said upper portion; and said ribs have outer tips resting on said shoulder, such that milk flows radially outwardly and downwardly along said skirt portion between said ribs and toward said shoulder and then downwardly through said gap and along said inner surface of said cylindrical wall along said lower portion.

31. A milk meter comprising a measuring chamber having an inlet receiving milk from a mammal's teat, and an outlet, said measuring chamber comprising a cylindrical chamber having a cylindrical wall with an inner surface, a baffle in said cylindrical chamber directing milk flow from said inlet to said inner surface of said cylindrical wall to flow therealong, wherein:

said baffle has an outer surface along which milk flows, and an inner surface facing an interior portion of said baffle;

and comprising:
means supplying vacuum to said interior portion of said baffle; and
a vacuum-transfer passage communicating vacuum from the interior of said baffle to the portion of said measuring chamber surrounding said baffle and above the level of milk in said measuring chamber.

32. The milk meter according to claim 31 wherein:

said baffle comprises an upper cylindrical section and a lower frustoconical section tapered downwardly and outwardly therefrom; and said vacuum-transfer passage is provided through said upper cylindrical section of said baffle.

33. The milk meter according to claim 32 comprising:

a valve opening and closing said outlet, wherein said valve comprises:

a movable plunger having an outer peripheral seal engageable with said outlet, and an inner vacuum-transfer passage communicating vacuum to said interior portion of said baffle.

34. A milk meter comprising:

a measuring chamber having an inlet receiving milk from a mammal's teat, and an outlet;

a discharge chamber having an inlet receiving milk from said outlet of said measuring chamber, and an outlet discharging the milk to a collection tank;

a baffle in said discharge chamber directing milk flow from said inlet of said discharge chamber into said discharge chamber, wherein:

said discharge chamber has a dam wall around said outlet of said discharge chamber;

said dam wall has a limited-flow opening therein for limiting milk flow from said discharge chamber to said outlet of said discharge chamber; and said baffle is located in said discharge chamber between said inlet of said discharge chamber and said outlet of said discharge chamber and has an outer portion directing milk flow into said discharge chamber laterally beyond said dam wall, to prevent direct milk flow from said inlet of said discharge chamber to said outlet of said discharge chamber, such that milk must flow through said limited-flow opening in said dam wall.

35. A milk meter comprising:

a measuring chamber having an inlet receiving milk from a mammal's teat, and an outlet;

a discharge chamber having an inlet receiving milk from said outlet of said measuring chamber, and an outlet discharging the milk to a collection tank;

a baffle in said discharge chamber directing milk flow from said inlet of said discharge chamber into said discharge chamber, wherein:

said baffle is at said inlet of said discharge chamber;

said baffle comprises a hat-shaped member having a central portion extending into said outlet of said measuring chamber, and an outer peripheral flange extending from said central portion radially outwardly and into said discharge chamber;

said flange is spaced from said inlet of said discharge chamber by a gap through which milk flows which is then directed away from said central portion of said baffle and radially outwardly along said flange into said discharge chamber.

36. A milk meter comprising:

a measuring chamber having an inlet receiving milk from a mammal's teat, and an outlet;

a discharge chamber having an inlet receiving milk from said outlet of said measuring chamber, and an outlet discharging the milk to a collection tank;

a baffle in said discharge chamber directing milk flow from said inlet of said discharge chamber into said discharge chamber, wherein:

said baffle is at said inlet of said discharge chamber;

said discharge chamber has a lower floor with an opening providing said outlet of said discharge chamber;

said discharge chamber has a support wall extending upwardly from said lower floor and supporting said baffle proximate said inlet to said discharge chamber;

said baffle includes a peripheral flange spaced above said outlet of said discharge chamber for directing milk flow into said discharge chamber laterally outward of said outlet of said discharge chamber; and said support wall includes a dam wall having a limited-flow opening therein through which milk flows from the laterally outward portion of said discharge chamber toward said outlet of said discharge chamber, such that milk entering said discharge chamber through said inlet thereof is directed by said baffle laterally outwardly to said lower floor laterally outward of said dam wall and then flows laterally inwardly through said limited-flow opening to said outlet of said discharge chamber such that milk slowly exits said discharge chamber without slugging.

* * * * *